(12) United States Patent
Sharma

(10) Patent No.: US 8,671,123 B2
(45) Date of Patent: Mar. 11, 2014

(54) CONTEXTUAL ICON-ORIENTED SEARCH TOOL

(75) Inventor: Manoj Sharma, Wellesley, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/363,406

(22) Filed: Feb. 1, 2012

(65) Prior Publication Data

US 2013/0198224 A1 Aug. 1, 2013

(51) Int. Cl.
*G06F 12/00* (2006.01)
*G06F 7/00* (2006.01)
*G06F 17/30* (2006.01)
*G06F 3/048* (2013.01)

(52) U.S. Cl.
USPC .......................... 707/821; 707/706; 715/764

(58) Field of Classification Search
USPC .................................. 707/706, 821; 715/764
See application file for complete search history.

(56) References Cited

U.S. PATENT DOCUMENTS

| | | | | |
|---|---|---|---|---|
| 5,544,360 | A * | 8/1996 | Lewak et al. | 1/1 |
| 6,249,773 | B1 * | 6/2001 | Allard et al. | 705/26.8 |
| 7,856,441 | B1 | 12/2010 | Kraft et al. | |
| 8,392,836 | B1 * | 3/2013 | Bau et al. | 715/739 |
| 2006/0206459 | A1 | 9/2006 | MacLaurin et al. | |
| 2008/0005072 | A1 | 1/2008 | Meek et al. | |
| 2009/0144234 | A1 | 6/2009 | Sharif et al. | |
| 2009/0144262 | A1 | 6/2009 | White et al. | |
| 2009/0222445 | A1 | 9/2009 | Tavor | |
| 2009/0307205 | A1 | 12/2009 | Churchill et al. | |
| 2011/0072086 | A1 * | 3/2011 | Newsome et al. | 709/204 |

OTHER PUBLICATIONS

"iPhone Application Development: Implementing a Custom Picker (part 1)." Online. http://programming4.us. Feb. 28, 2011. 4 pages.*
"How to Create iPhone-Style Navigation (Part I)." Online. http://www.webstuffshare.com. 15 pages. Feb. 14, 2010.*
"Visual Query Suggestion", Oct. 24, 2009, Retrieved at <<http://citeseerx.ist.psu.edu/viewdoc/download?doi=10.1.1.193.1778&rep=rep1&type=pdf>> In the proceedings of the 17th ACM international conference on Multimedia, pp. 15-24.

* cited by examiner

*Primary Examiner* — Charles Lu
(74) *Attorney, Agent, or Firm* — Tom Wong; Brian Haslam; Micky Minhas

(57) ABSTRACT

A context icon-oriented user interface for indicating search criteria allows a user to select a first icon associated with an individual for which information associated with a second icon, and potentially select further icons that are retrieved and presented to the user. A context determines the universe of first icons that are presented for selection by the user, and a stickiness level between the user and individuals in the universe of first icons may further reduce the universe of first icons based on various factors, including prior interaction with the user. Search results based on a combination of icons are then returned to the user, allowing the user to visually request searches without recalling keywords used to define the search query.

15 Claims, 9 Drawing Sheets

CONTEXTUAL ICON-ORIENTED SEARCH TOOL

BACKGROUND

Various computerized search tools are available for users to search for information. These search tools employ various algorithms for searching for information on the web. Many of these search tools rely on users entering or speaking natural language text that includes keywords for performing a search. These search tools are predicated on the user knowing the appropriate keywords of the subject to be searched.

Users, however, may not always know the keywords for performing a search. In such cases, search tools relying on keyword entry are unlikely to return targeted search results. For example, a user may desire to perform a search involving an individual that the user knows, but for whom the user cannot recall the individual's name. In other instances, the user may not know the individual's full name or may not know the name of the person at all.

A user may search for information involving individuals within a certain context. Conventional search engines are not able to account for individuals within such a context. For example, a user may desire to perform a search for information within a context of individuals that are neighbors, personal friends, or work colleagues. In other examples, a user may want to search for information taking into account work colleagues they commonly interact with, as opposed to work-colleagues they rarely interact with. Conventional search engines do not allow users to designate a context, let alone adjust a scope of the context of the information to be search.

It is with respect to these and other considerations that the disclosure made herein is presented.

SUMMARY

Concepts and technologies are described herein for providing a dynamic contextual icon-oriented graphical user interface to facilitate searching information associated with individuals known to the user. In one embodiment, a computer implemented method for processing a search request includes the operations of providing a user interface by a processor, the user interface includes a first set of icons, wherein each icon in the first set of icons represents a person or a group of persons, and the first set of icons includes a subset of a first superset of icons. The computer implemented method further includes providing from the processor on the user interface a second set of icons, wherein each icon in the second set of icons represents a type of information, and the second set of icons includes a subset of a second superset of icons. The computer implemented method further includes receiving a search request at the processor indicating a selected first icon from the first set of icons and a second selected icon from the second set of icons, and providing a search result from the processor including a name of at least one file, wherein the name of the at least one file is associated with the person or the group of persons represented by the selected first icon and the name of the at least one file is further associated with the type of information represented by the second selected icon.

In another embodiment, a computer readable medium storing instructions thereon which when executed by a processor cause the processor to provide by the processor a user interface including a first set of icons, wherein each icon in the first set of icons represents a person or a group of persons, the first set of icons comprising a subset of a first superset of icons. The instructions further cause the processor to provide by the processor on the user interface a second set of icons, wherein each icon in the second set of icons represents a type of information, and the second set of icons includes a subset of a second superset of icons. The instructions further case the processor to receive a search request at the processor indicating a selected first icon from the first set of icons and a second selected icon from the second set of icons, and provide a search result from the processor, the search result including a name of at least one file, wherein the name of the at least one file is associated with the person or the group of persons represented by the selected first icon and the name of the at least one file is further associated with the type of information represented by the second selected icon.

In another embodiment, a server configured for processing search requests includes interface for receiving a search request from a computing device and a memory configured to store a first superset of icons, representing a person or a group of persons, and where the memory is further configured to store a second plurality of second icons representing a document type. The server further includes a processor configured to provide a user interface including a first subset of the first superset of icons and a second subset of the second superset of icons, receive the search request comprising a first selected icon from the first subset and a second selected icon from the second subset, and retrieve at least one filename of a document where the document is associated with an individual or group of individuals associated with the first selected icon, and wherein the document is of a type associated with the second selected icon. The processor is further configured to provide the at least one filename of the document to the computing device in response to the search request.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
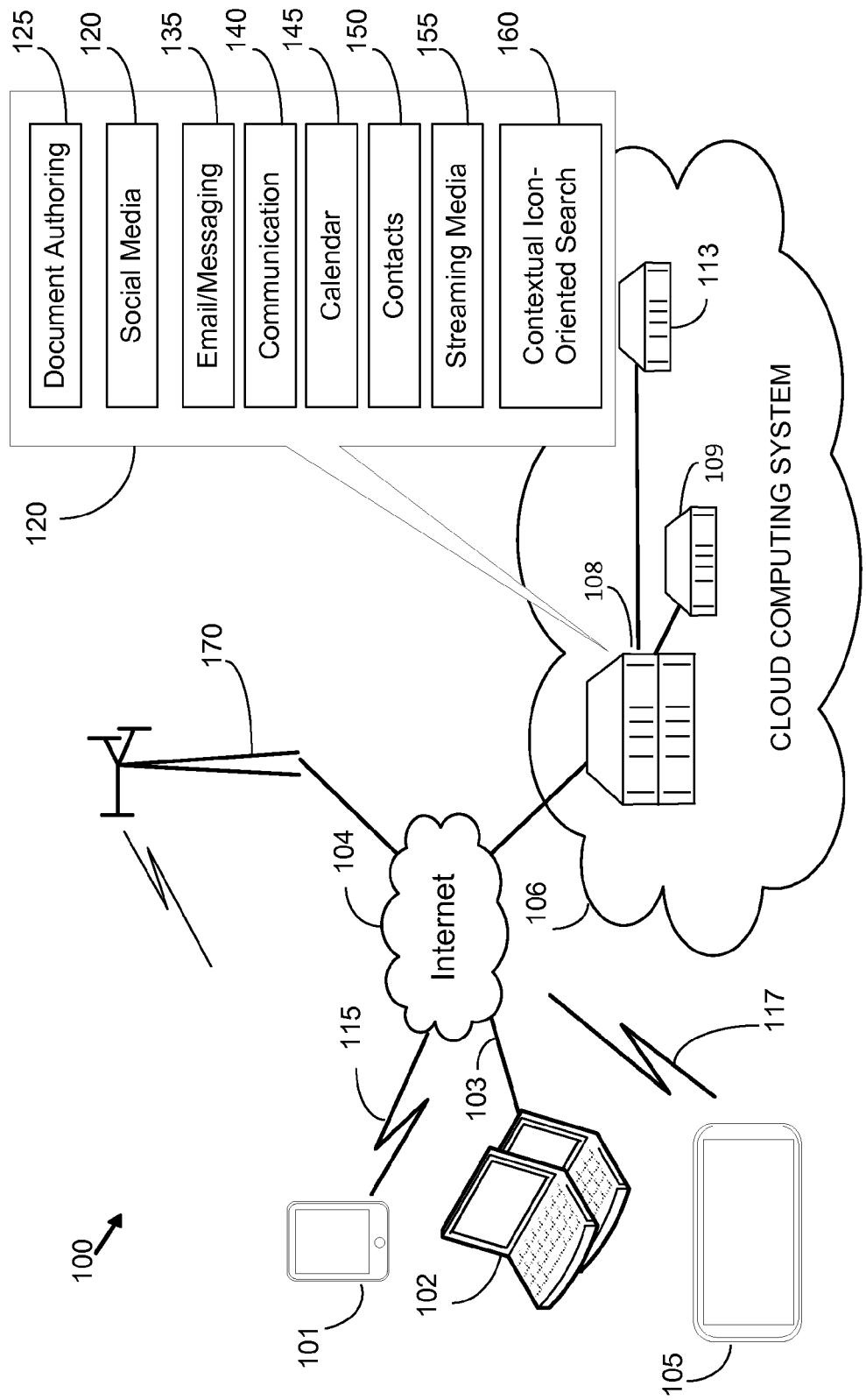
FIG. 1 is a context of using the concepts and principles of an contextual icon-oriented search tool according to one embodiment presented herein.

In the following detailed description, references are made to the accompanying drawings that form a part hereof, and which are shown by way of illustration specific embodiments or examples. Referring now to the drawings, in which like numerals represent like elements throughout the several figures, aspects of configuring a drawing guide will be presented.

The following detailed description is directed to a contextual icon-oriented graphical user interface that facilitates searching for information associated with various individuals known to the user in an indicated context. The searching tool is based on using icons for formulating key topics associated with the search request. Further, the icons presented to the user may be associated with a given context indicated by the user, and the set of icons in the given context can be dynamic.

The icons may be presented in different rows, with the rows being hierarchical. The initial hierarchy of icons, e.g., those in the first row may represent individuals or groups of individuals. The icons can comprise photographs or other types of images. This feature allows the user to search for information associated with individuals depicted in the icons whose full names that the user may not be able to readily recall.

The context icon-oriented search ("CIOS") tool is able to maintain a set of individuals associated with a particular context for the user, and is further able to dynamically adjust the scope of a given context by presenting a subset of the icons in a context. This feature can also adjust the set of icons representing individuals according to how frequently the user frequently interacts with those individuals. These and other features are described further in the following disclosure.

One context of the application of the concepts disclosed herein is shown in the system illustration 100 of FIG. 1. In FIG. 1, the user could be using various types of computing devices for executing the CIOS tool, including a smart phone 101, a laptop computer 102, or a tablet computing device 105. Application of the concepts herein is not limited to these types of computing devices, as the concepts can be used by other types of computing devices, including desk top computers, personal digital assistants, and other types of devices known to those skilled in the art.

The computing devices can utilize wireless connections 115, 117 to interact with a cloud computing system 106. The wireless connections for the devices are conveyed in one embodiment by the Internet 104 to the cloud computing system 106 and can be based on various readily available technologies, including various cellular-based technologies (CDMA, GSM, 4G, EDGE, etc.) associated with cellular infrastructure 170 provided by a cellular service provider or other wireless technologies (e.g., WiMax, WiFi, etc.) The wired technologies can be based on ISDN, cable modems, DSL, and other well-known forms.

The connectivity afforded by the wired 103 and wireless 115, 117 communications through the Internet 104 provides the computing devices with access to servers 108 in the cloud computing system 106. The computing devices can download or interact with the CIOS tool from the server 108 as necessary for local execution, or can interact with a CIOS tool executing on the server 108. Other configurations are possible.

In some embodiments, the mobile devices may execute a thin-client or browser interacting with an application on the server 108. The CIOS application may interact with a client application executing in any of the computing devices, such as a smart phone 101, laptop computer 102, or tablet computing device 105. The search tool 160 may be executing in more than one server 108, and may access data stored in another server 109 or a remote server 113. In some embodiments, the data may be stored in associated with an enterprise or other affiliation of individuals.

The computing devices may interact with the CIOS tool implemented as a web server providing web pages. In one embodiment, the computing device may execute a Web browser application, such as the MICROSOFT® INTERNET EXPLORER® Web browser from Microsoft Corp. of Redmond, Wash. In another embodiment, the browser client may be an embedded component of the operating system ("OS") of the user computing device. Additionally or alternatively, the browser client may utilize any number of communication methods known in the art to communicate with the server 108.

The application webpages provided by server 108 may include at least one user interface ("UI") as is known in the art, embodied in a webpage. The webpage 126 may include hypertext markup language ("HTML"), extensible markup language ("XML"), JavaScript object notation ("JSON"), and the like that specify instructions regarding how the UI is to be rendered by the computing device on its display.

Although the concepts illustrated herein may refer to a single server 108, there may be various servers involved. For example, one server 108 accessed by a device may in turn access another server 113. A plurality of download servers may be used in another embodiment. The server 108 may interface with these other servers using a local-area network ("LAN"), a wide-area network ("WAN"), the Internet, or any other networking topology known in the art that allows communication between these servers.

The server 108 may execute various application programs 120. These may be executed in a shared or distributed manner across one or more servers with the computing device comprising the smart phone 101, laptop computer 102, or tablet computer 105. The application programs 120 may include a drawing application 121 for creating and editing graphical oriented programs. Applications for editing images, video, etc. may also be considered with the scope of a drawing application. Other forms of authoring applications 125 may also create and edit documents, such as text documents and spread sheet documents.

Other applications executing on the server 108 may include social media applications 120 for group related messaging and communications. Another application program present may be an email/messaging application 135 may allow for various messaging capabilities, including instant messaging. A communications application 140 may allow for video chat or voice communication. A calendar application 145 may allow for organizing meetings and events. A contact application 150 may allow for organizing contact information for individuals. A streaming media application 155 may provide for streaming digital data, such as audio or video files. Each of these applications may store data, which the server 108 may maintain in a data store 109, which can comprise various storage systems. As will be seen, these applications may be accessed in conjunction with operation of the CIOS tool.

Figure 2:
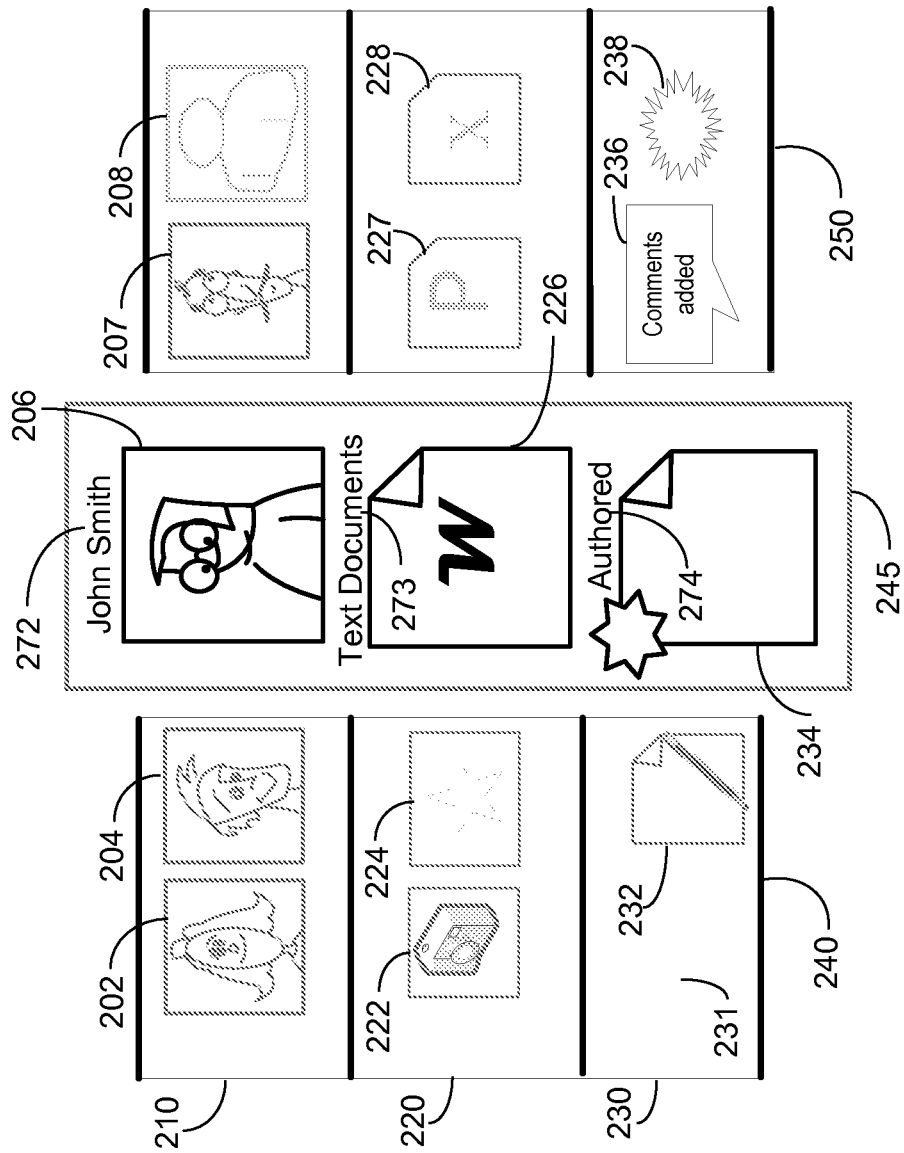
FIG. 2 is a portion of a graphical user interface for receiving user input for composing a contextual icon-oriented search request.

Turing to FIG. 2, one embodiment of certain elements of the user interface provided to the user are shown. As will be seen, the format, layout, and operation of the user interface can vary, and FIG. 2 is not intended to limit in any way alternative user interfaces that can be used that incorporate the principles disclosed herein.

The user interface provided to the user is customized for the user. Specifically, a set of icons are presented to the user that are associated with the user in some manner. In one embodiment the user can be identified to the CIOS tool prior to use, so that the CIOS tool is able to configure the icons as appropriate for the user. This identification can be accomplished by conventional user identification mechanisms, including a user providing a user identifier. In other embodiments, a system administrator may define the user to the CIOS tool, such as when the user is an employee for an enterprise. In some embodiments, the system administrator may provide one set of icons and/or user interface configuration to staff level employees, and another set of icons and/or user interface configuration customized for each manager level employee.

FIG. 2 depicts one embodiment of the user interface that is organized into two or more rows of icons. For purposes of analogy, the icons in these rows may be used to answer questions of "who", "what", and "when" in regard to formulating a search by the user. The first row may indicate "who", the second row may identify "what", and the third row may indicate "when." However, this analogy is only for illustrating basic operation of the CIOS tool, and should not be interpreted as limiting the scope of the type of icons that may appear in a given row. As will be readily seen, many of the icons in each row may a have a scope that extends beyond indicating "who", "what", or "when." Further, customized icons that represent unique search criteria can be defined for each row.

In the first row 210, a series of images 202, 204, 206, 207, and 208 are shown (each image may be referred to as an "individual image" or "image icon"). The arrangement shown in FIG. 2 has magnified the center individual image 206 indicating that this is the current icon selected by the user ("selected icon"). In addition, the individual's name 272 associated with the selected icon is also indicated above the image. In this example, the name is John Smith. Any search query performed will involve John Smith, the currently selected individual.

The icons may be actual images (photographs) of individuals, which is intended to be represented by icons 202, 204, 206, and 208 depicted in FIG. 2. For purposes herein, an image, such as a photograph is considered a type of icon, but the icons can also be drawings, or other any other form of representation of the individual. The image icons may be collected from various sources, including social web sites, user provided photographs, or enterprise directories. Other image icons may be generic outlines of an individual, such as shown in icon 208. As will be seen later on, the icons in this row can be defined to represent a group of individuals. Furthermore, in other embodiments the icons could be defined to represent topics, abstract concepts, or projects. An image icon could be defined to represent for example, a work project plan or subject area.

The first row 210 of icons can be analogized to defining "who" is the focus of the search by the user. Reference to the "image icon" refers to an icon suitable for displaying in the first row. The icons in the first row are associated with a context, which defines a set of individuals having a common affiliation. For example, a context for the first row of icons could be defined as a set of individuals affiliated by work (i.e., work colleagues). Another context could be a set of individuals that are relatives of the user. Other contexts could be neighbors, clients, vendors, friends, etc. The user can define a context, or a system administrator may define a context for the user. For example, in an enterprise environment, a system administrator may define contexts for users along the lines of an organization. Thus, an icon could represent an organization of individuals (e.g., a department). For purposes of illustration, the selected icon in the first row may also be referred to as the "selected individual," but this language should not be interpreted as limiting the image icon as to one that only represents an individual.

The second row of icons 220 comprises information that can be analogized to defining "what" is the focus of the search by the user. In this embodiment, the icons in the second row 220 may represent the different types of information that can be associated with the selected individual from the first row 210. Because the rows are hierarchical, the second row is limited by the first row. In other words, the search for the type of information is within the scope of the selected image icon.

One icon representing a type of information can be a camera icon 222. The camera icon represents photographs or other types of graphical images associated with the selected individuals. The images could be photographs that were taken by the selected individual, depicting the selecting individual, or recommended by the selected individual. In some embodiments, additional or different icons may be created that can further narrow down the type of images, such as a color camera icon for searching for color photographs and a black-and-white camera for searching for black and white photographs. In other embodiments, the definition for the icon may be different than described.

The next icon depicted in the second row 220 is the star icon 224. The star icon 224 represents documents that are "favorites" of the individual indicated in the first row. The scope of the term "document" herein encompasses various types of media and files, and includes word processing documents, movies, images, spreadsheets, presentations, web sites, book titles, blogs, emails, etc. The star icon 224 may be used to request a search of documents that the selected individual recommends, views, frequently accesses, or otherwise is associated with the selected individual in some manner. The scope of this type of search may vary based on the context of the individuals presented in the first row 210. For example, searching for a "favorite" document in the context of a work colleague may be defined as searching for a frequently accessed enterprise related file. Searching for a "favorite" document in the context of a friend may be defined as searching for a recommended movie or book. The meaning of an icon can be determined in part by the context of the image icon.

The next icon, referred to as the text icon 226, is the currently selected icon because of its position in the center column 245. A text indication 273 of the icon's meaning appears above the icon. The text icon 226 may refer to documents that comprise word-processing documents, which can encompass any type of text-based document. The text based documents could include or be limited to memos, letters, books, articles, marketing materials, etc. In some embodiments, this icon could be construed to be any type of work product that is text based, but in other embodiments the scope of the subject matter encompassed may be narrowed to exclude graphical work product or spreadsheet work products.

In the embodiment illustrated in FIG. 2, a separate graphical icon 227 is defined to indicate slides or graphical subject matter, and another icon, a spreadsheet icon 228 is defined for spreadsheet oriented subject matter. As can be appreciated, a number of different icons can be defined to represent various scopes of subject matter. Typically, the icons represent some type of information (text, video, graphics, etc.), but the icons can be defined at a more granular level to also represent the contents of that type of information. For example, an icon could be defined in the context of an enterprise to represent memos for Project X and another icon could be defined to represent memos for Project Y. Thus, there is the ability to define custom icons.

The set of icons presented in the second row may be dependent on the context of the icons presented in the first row. For example, the type of icons shown in the second row may depend on whether the context of the first row is "personal friends" or "work colleagues." While there may be a need to define an icon for identifying memos for Project X in a work environment, it may be unlikely, that this icon would have application in a context of "personal friends."

The third row 230 of icons may further narrow the scope of the requested search as defined by the first row and the second row. The type of limitations indicated by the third row could be analogized as to defining "when." For example, this may include icons representing "recently viewed" documents or "viewed within the last week." Other icons could be defined to represents documents older than one year. As it will be seen, these icons are not limited with respect to characterizing information by time, but may include other characteristics such as whether the user edited, commented, or received the information selected in the second row. Thus, analogizing this the third row as being time oriented should not be construed to limit the type of icons that can be used.

In regard to the icons that can be presented in the third row 230, it should be first noted that a "blank" icon 231 can be selected by the user. The "blank" icon 231 is represented in FIG. 2 by the absence of an icon in the left-most position. In other embodiments, the "blank" icon may be represented as an empty box. The "blank" icon 231 represents a null limitation. In some embodiments, the user may request information that is not further limited, and hence the "blank" icon may be selected. In other words, the search for information is only limited by the selected icons in the first row and second row.

The next icon shown is the "pencil and paper" icon 232 that represents edited documents. Documents which have been modified or otherwise edited by the selected individual can be indicated as a search limitation. The "authored" icon 234, which is depicted as the currently selected icon, represents search criteria comprising documents that have been created or authored by the selected individual. Again, a text indication 274 of the icon's meaning is provided above the icon when the icon 234 is selected. The "comments added" icon 236 represents search criteria comprising documents that have comments added by the selected user. Finally, the "recently viewed" icon 238 represents search criteria comprising documents that have been accessed by the selected user.

The above example illustrates an embodiment where the first row of icons pertains to "who" (or broadly involving people in some form), and the second row of icons pertains to "what" (or broadly involving subject matter or type of documents in some form). This example is provided as it generally has application in a business environment, and the concept of "context" can be easily illustrated.

However, in other embodiments, the first row of icons can be selected based on other concepts, and may not involve individuals, but other members of a group. For example, in the context of a location of the user, the icons presented on the first row may identify retail locations. More specifically, the user may be located in a shopping mall, and in this context the icons in the first row identify retail stores operating in the mall. The second row of icons may further indicate the type of store (e.g., clothing store, jewelry store, food stand, etc.) The third row could indicated, for example, a type of food. The set of icons could be used to formulate a search for nearby Chinese food restaurants. This type of application illustrates an embodiment which may find utility more so for personal use, as opposed to in an enterprise. The illustration of the concept in application involving an enterprise environment where documents are being searched for does not preclude application of the principles herein to searching for other information.

Further, it is not required that the context of the third row of icons is necessary limited by, or limits, the first row and second row of selected icons. In other words, the third row could be a parameter that introduces a different dimension, such as time. Thus, an icon for the third row could be "recent" or "distant." Alternatively, it could represent concepts of "nearby," "recommended," or "new." The user may be able to even define criteria for the third row of icons. The icons presented in the third row (as well as the second row) may not necessarily be limited based on the selection of the previous row, although they may be in some embodiments.

Figure 3A:
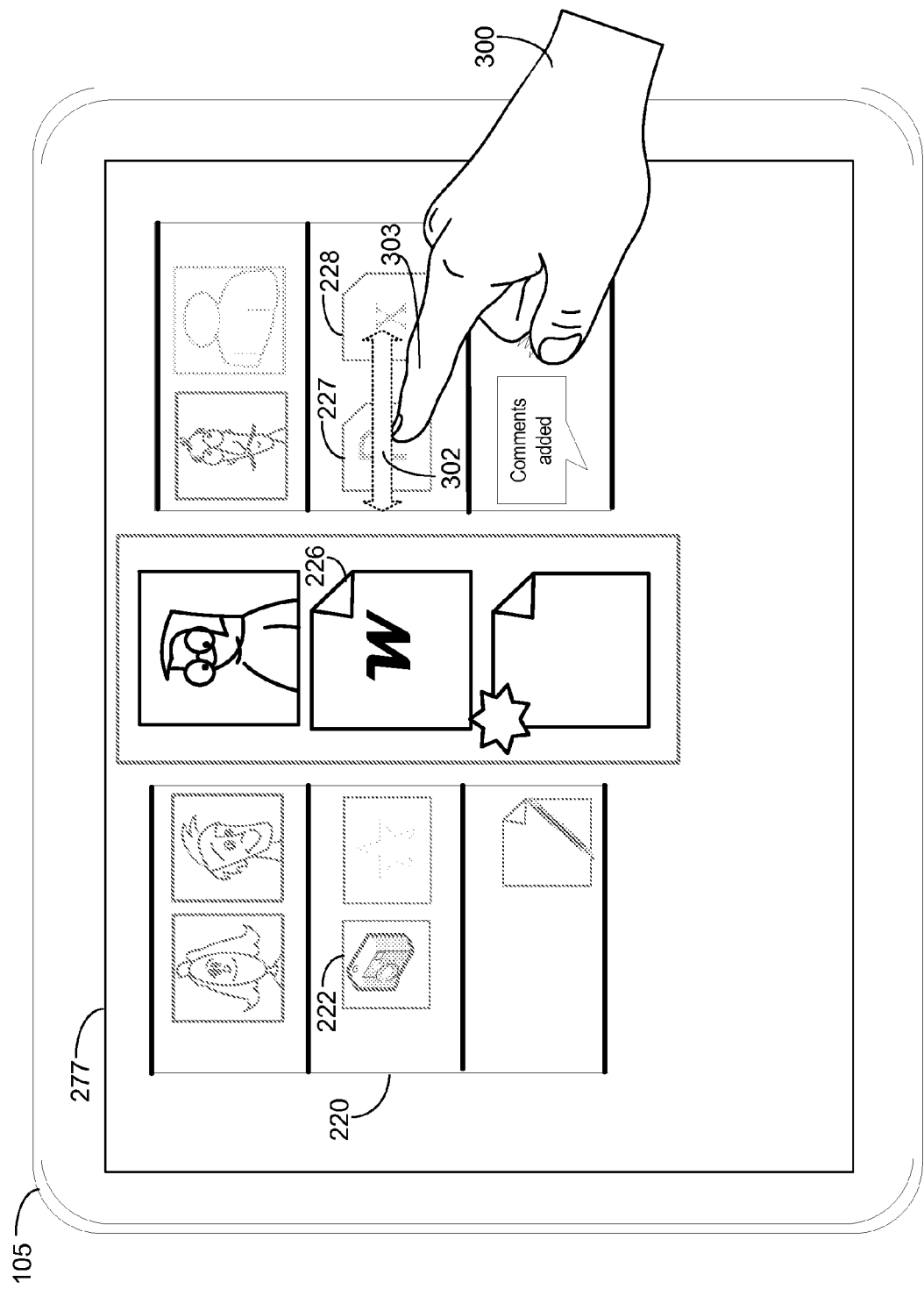
FIGS. 3A-3B illustrate the graphical user interface on a computing device being used to formulate the contextual icon-oriented search request.

In FIG. 2, the selected icon was shown in the center column 245, which each icon enlarged and associated with a text indication of the interpretation of the icon. The selection of the icon by the user can be accomplished in various ways, with one embodiment illustrated in FIGS. 3A and 3B. In FIG. 3A, a tablet computing device 105 is shown having a display portion 277 that illustrates the user interface. As shown in the embodiment of FIG. 3A, the user can touch a selected icon with their finger 303 of their hand 300, and can move the entire row of icons side-to-side as shown by arrow 302. As the row of icons moves left or right, the current selected icon in the center column changes. Specifically, in the current configuration, the left-most icon is the camera icon 222 and the right-most icon is the spreadsheet icon 228.

Figure 3B:
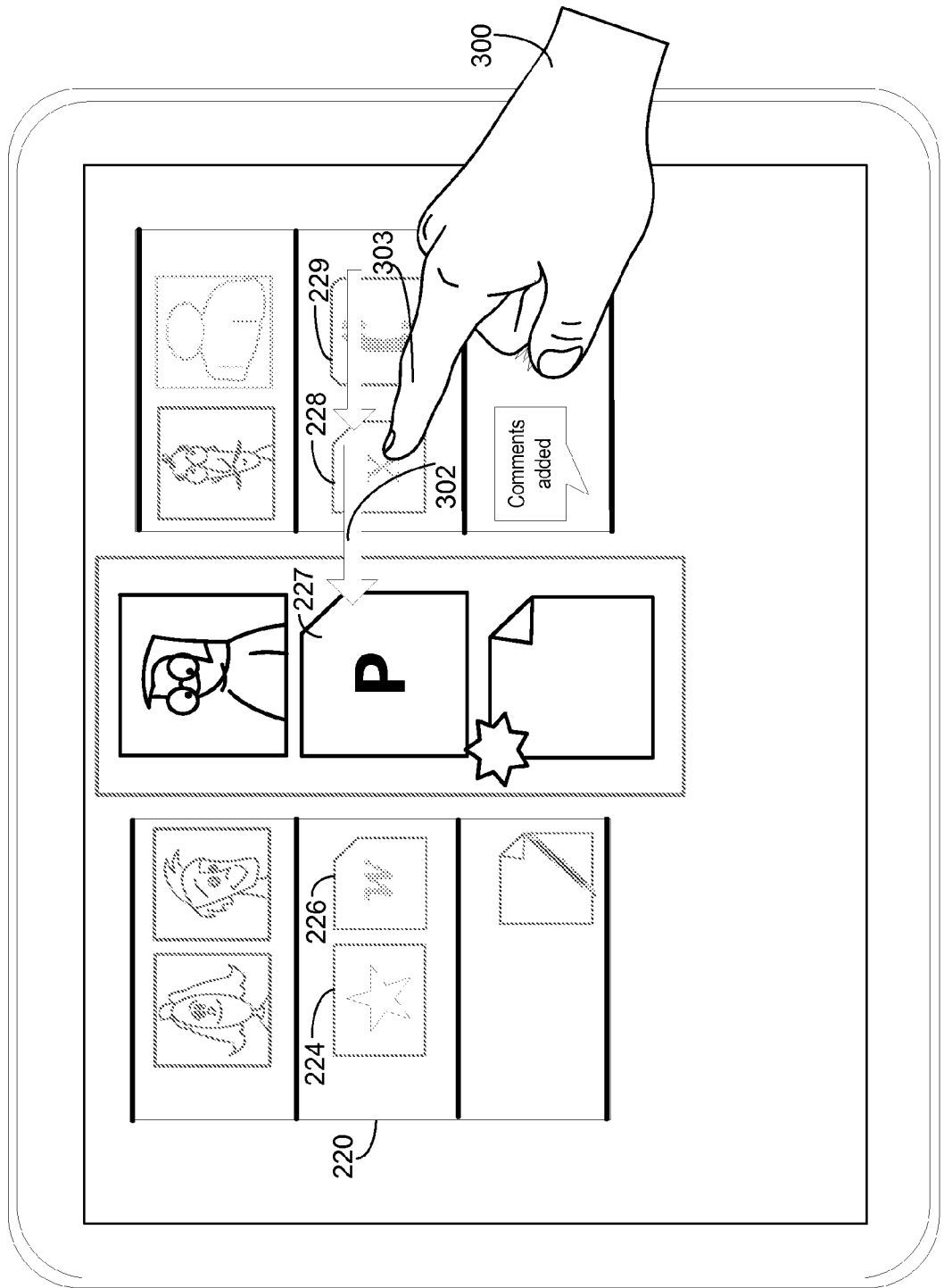

In FIG. 3B, the user slides their finger 303 to the left, thereby dragging the entire row of icons to the left. The left-most icon drops off from the display, and the slide icon 227 is feature in middle column 245. A new icon, a "phone" icon 229 appears on the right-side of the second row. As the new selected icon, the slide icon 227 is currently the selected icon in the middle column, and is therefore emphasized. Each of the rows in the user interface may be manipulated by selecting and dragging an icon horizontally.

The number of icons in a row may vary, and this user interface configuration depicts five icons in a row at any given time. In other embodiments, a different number of icons can be presented. In various embodiments, the icons in the row can virtually wrap-around, so that a continuous loop of icons can be dragged in a direction. However, only one icon in each row is selected at a given time. The user interface readily allows the user to select various combinations of icons in the various rows to define the search criteria for a search request.

Figure 6:
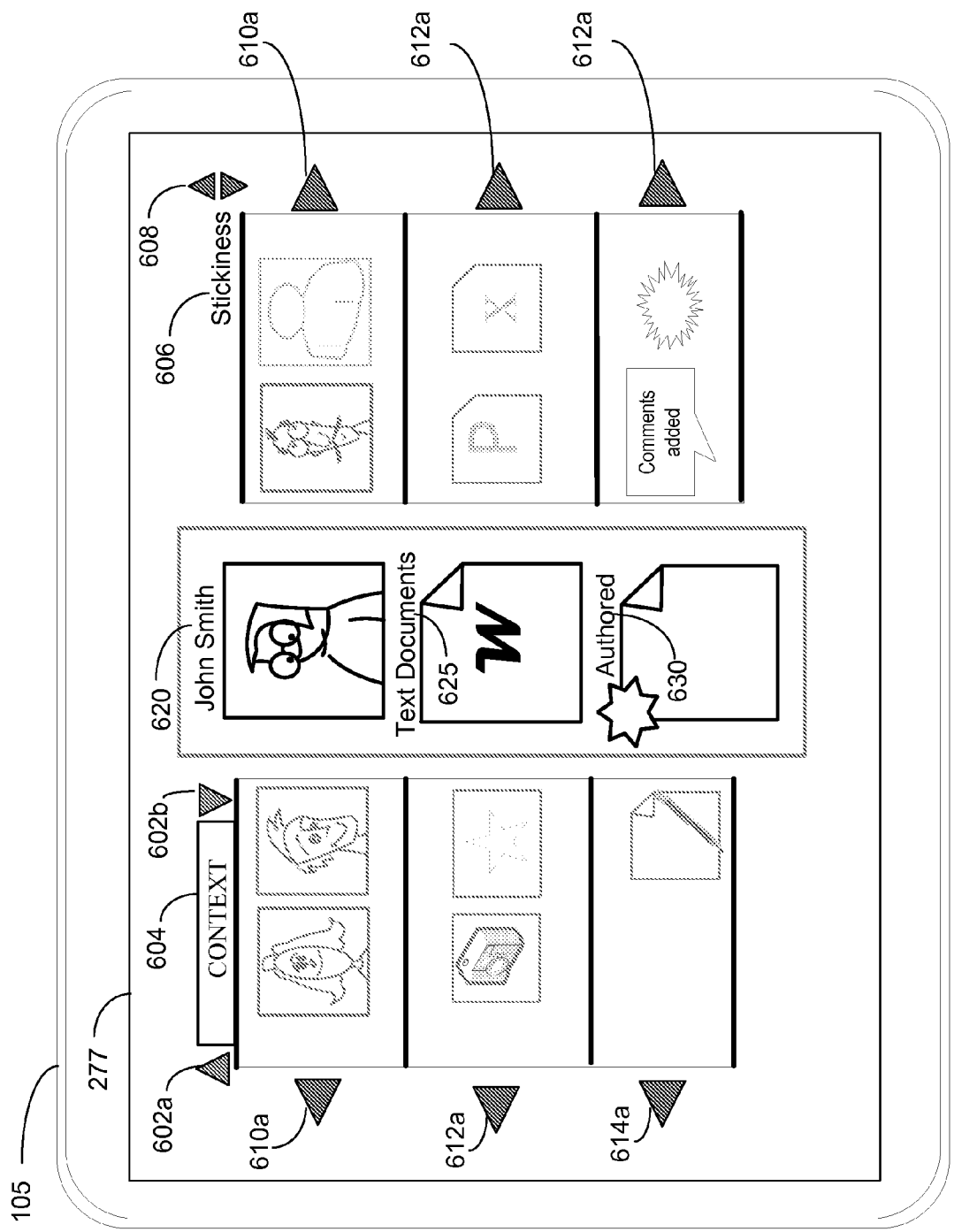
FIG. 6 illustrates various controls that can be used in altering a context of icons presented to the user in selecting an individual associated with a search request.

In other embodiments, user controls may be presented to move a row of icons. For example, as illustrated in FIG. 6, user controls 610a, 610b, 612a, 612b, 614a, and 614b can be used to slide a row to the left or right by selecting the appropriate user control using a pointing device, such as a mouse.

In other embodiments, the user may indicate that an additional row of icons should be presented for selection. In some embodiments a single row (or two rows) of icons may be presented to the user. The user may indicate that an additional row is to be presented in order to indicate additional search criteria. The user may also be able to select the types of icons presented in the row. For example, the first row could be used by the user to indicate a person, and the second row indicating a type of information (e.g., movies). The user may request a third row to be presented, which includes an icon that requests "what is followed" or "recommended" by the person. The combination of icons would allow a user to learn what movies a specific person is interested in or recommending.

Figure 4:
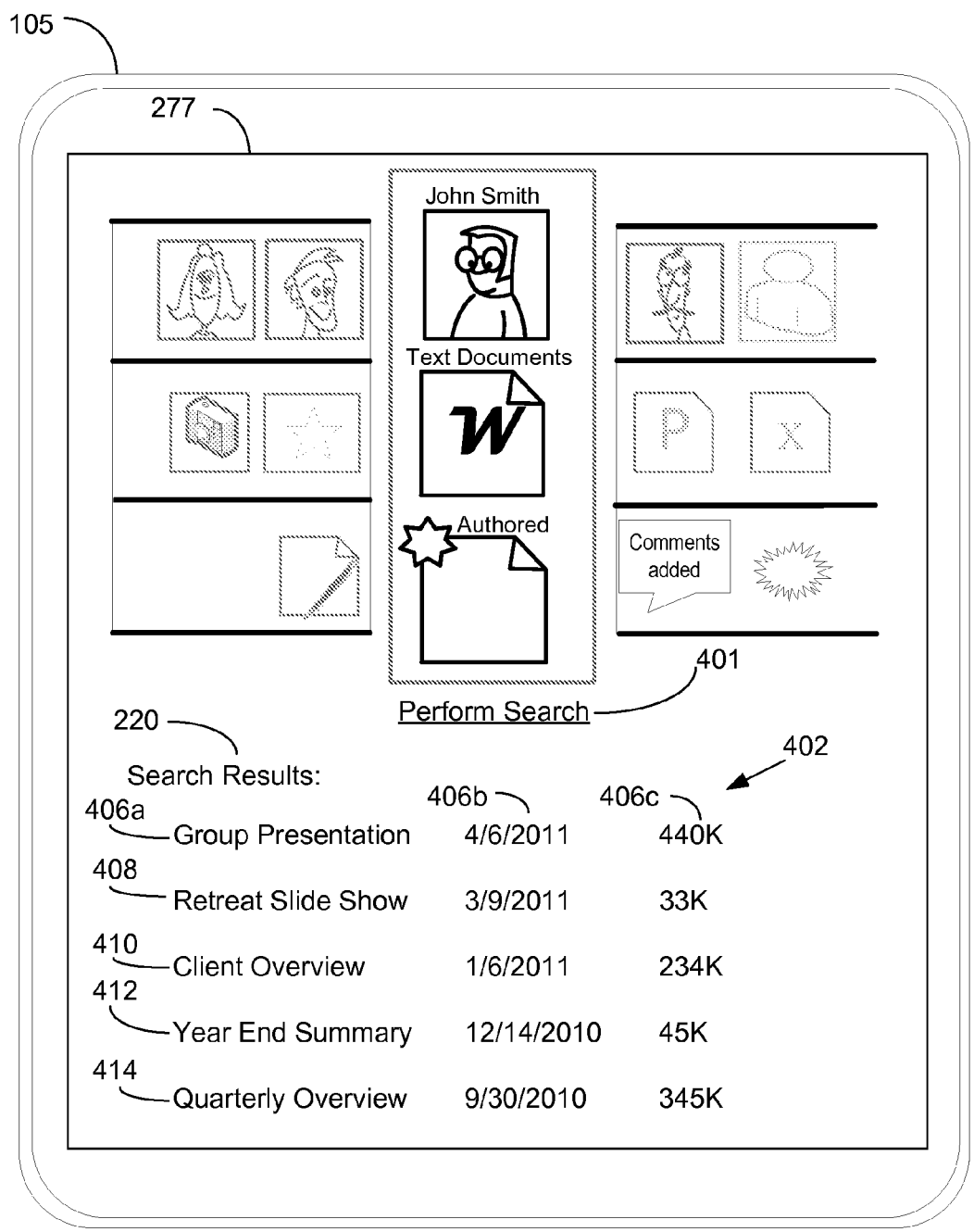
FIG. 4 illustrates results from using the contextual icon-oriented search tool.

Once the user is satisfied with the selected icons representing the various search terms as indicated in the center column, the user may select a user control 401 as shown in FIG. 4. This user control can be invoked by touching the tablet computing screen. Once the user control is selected, and indication of the selected icons may be sent by the computing device to a server 108 in the cloud computing system 106.

In the selection of the icons shown in FIG. 4, the user has selected search criteria represented by the selected icon. The search request comprises criteria of text documents authored by John Smith. The results of the search can be displayed in a section 402 of the display 277. The search results 220 can comprise a listing of documents 406, 408, 410, 412, and 414. Each listing can comprise a title of the document 406a, e.g., "Group Presentation", a date authored 406b (e.g., "4/6/2011"), and a file size 406c (e.g., "440K"). The results can be organized by date, alphabetically by file name, or in no particular order. The number of search results shown on the display may be defined by parameters.

The use of photographic images for image icon to identify the selected individual in the first row of FIG. 2 allows the user to select a person whose name, or full name, is not readily recalled or known. This allows users, who can recall the person's image, but not their name, to indicate the person in a search request. Unlike conventional text-based query systems, the lack of a user's ability to recall an individual's name does not hinder formulating a search query.

Figure 5:
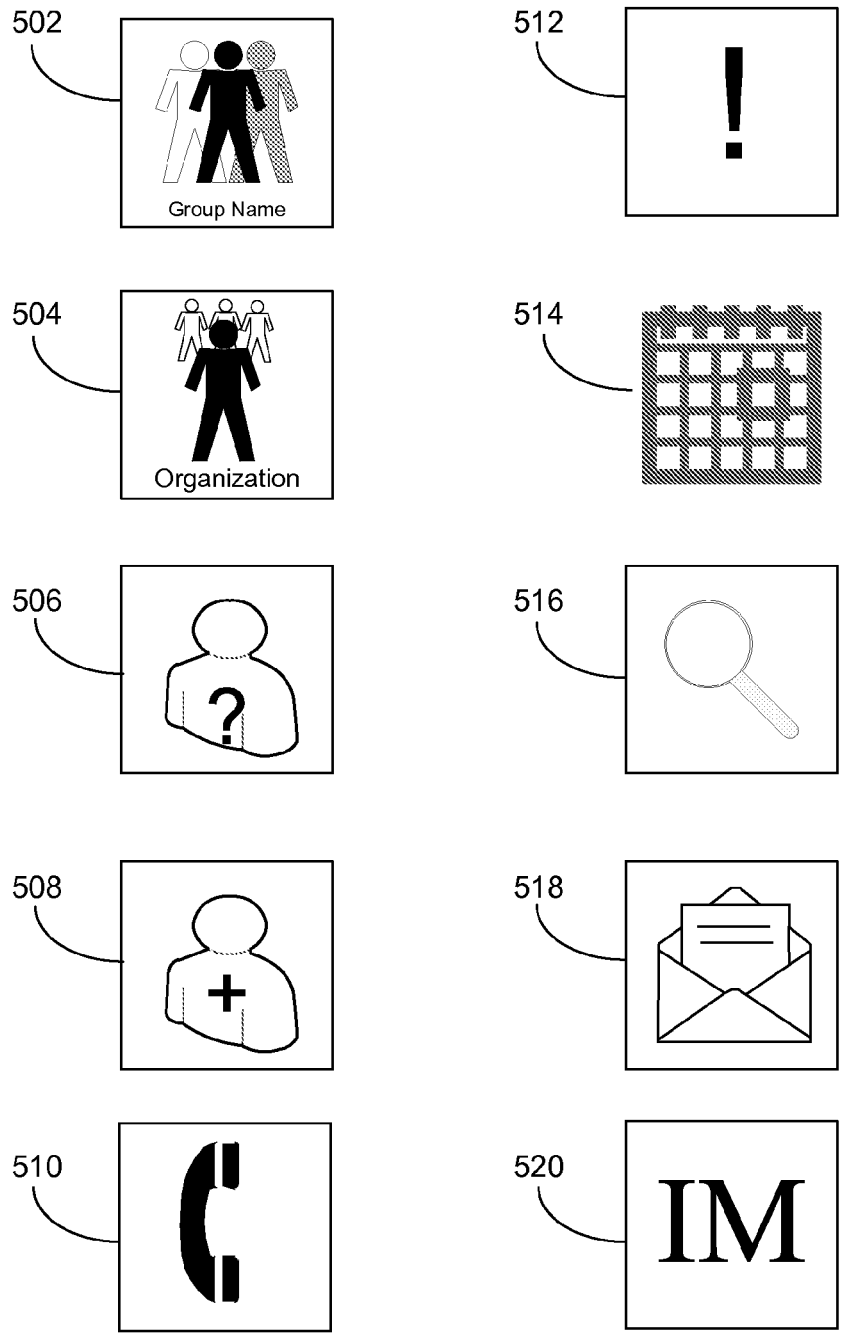
FIG. 5 illustrates various icons that can be used in requesting a contextual icon-oriented search request.

The icons shown in the first row do not have to be limited to representing a single individual, but can represent either groups of individuals or organizations. This can be explained in conjunction with reference to FIG. 5. In FIG. 5, various other icons that can be displayed are shown. A group icon 502 can be defined by the user as representing a group of individuals. The group could be a collection of friends, immediate family members, work colleagues, directors of a non-profit, etc. The user may be able to define the name of the group in the icon to aid in recalling the collection of individuals. In this embodiment, the icon represents a peer-based set of individuals, where all the individuals are depicted as the same size.

Another icon similar in shape is the organizational icon 504. This icon represents an organization, which may represent a group in an enterprise having a particular structure. For example, an enterprise may define various groups according to an organizational structure, such as a group comprising individuals associated with "sales" or a "technical support department." The name of the alias may be indicated in the icon as well.

Another icon that can be used is a "wildcard" icon 506. In some cases, the user may not be able to readily recall either the name of an individual and may not have an image of the person. In this case, the wildcard image icon 506 may be selected. The icon depicts a generic outline of a person with a question mark. As expected, using this as a search criteria will not limit the results to any particular individual.

As noted, image icons may be defined by a user. The management of image icons can be accomplished by using conventional user controls, but can also be accomplished by selecting icons defined to manage the additions or deletions of an icon. For example, to add a new image icon, an "add image icon" 508 could be selected. In other embodiments, a system administrator could manage the addition or deletions of images using other graphical user interfaces.

Additional icons can be defined for the second row—e.g., defining addition criteria for what type of information that the search criteria comprises. As can be appreciated by one skilled in the art, the number and type of icons, as well as their format, can greatly vary. For example, an "important" icon 512 can represent search criteria for all documents that are marked or identified as important or urgent. The "meetings" icon 514 can request all information associated with a meeting involving the selected individuals. The "meeting" icon 514 could request documents such as those referencing or involving an indicated meeting (e.g., meeting invites), or comprising follow up emails referencing the meeting in some way. Selection of this icon may result in the CIOS tool prompting the user to enter a particular date. Selection of an icon may open a pop-up window or user control for providing additional information.

The "inspect" icon 516 may request any document that has been approved, authorized, reviewed, opened, or read by the selected individual. The "email" icon 518 could request all email communication involving the selected individual, including those to, from, or copied to the selected individual. The IM (Instant Messaging) icon 520 can request any instant messaging sent or received from the selected individual. The "phone" icon 510 can request any phone related information, including voice mail messages, call logs, or billing information involving the selected user.

The selection of the image icons appropriate for display on a given row may depend on the particular image icon in the above row or rows. If, for example, the image icon indicates "John Smith" and the type of information is a "phone" icon representing voice communications, then it may not make semantic sense for the user to indicate a "comments added" icon in the third row. The "comments added" may be defined as limited to a text type document. The CIOS tool may limit the icons displayed in the third row to those icons that make semantic sense give the above selected icons. Other embodiments may address such combinations differently.

As evident, the CIOS tool can be used to initiate user search requests for information. Several examples illustrating the flexibility are illustrated below, which can be mapped to a set of icons that can be defined for a particular context:

a) Retrieve all phone messages from John Smith.

b) Retrieve a memo drafted by John Smith in the last month.

c) Retrieve photos depicting a family member.

d) Retrieve spreadsheets of membership dues in a social organization.

As disclosed above, the first row can comprise a set of image icons representing an individual or group. There can be multiple sets of image icons defined by a user. The set of image icons used to populate the first row is determined by a user-defined context. The context reflects a purpose of the search initiated by the user and determines the set of image icons displayed in the first row. For example, a user may utilize the search service for two different purposes. The user may search for business documents in the user's work environment or enterprise, or the user may search for family photos. In the first context, the user is searching for documents that are associated with an individual of a business enterprise. The relevant image icons for an enterprise context may involve specific image icons representing work colleagues or organizations. Further, the type of documents being searched may be of a specific nature—e.g., text documents. It is possible that a further level of granularity may be defined for this context. Specifically, there may be icons defined for search criteria comprising letter-based text documents or memo-based text documents.

On the other hand, if the user is searching for photos involving family members, the set of image icons may not involve business colleagues. Rather, the image icons displayed would likely involve immediate family members. In the context of immediate family members, there may not be any "letter-based text documents" or "memo-based text documents," and hence no need to display icons representing this search criteria.

To extend this analogy even further, assume that the user is maintains a leadership position in a church group, civic organization, or social group. This may be another example of a context in which the image icons presented in the user interface are different from work colleagues and family members. Further, searching for types of documents may be further limited that are distinguished from the other contexts.

Thus, a user may define various contexts. Each context has a universe or superset of image icons that can be displayed in the initial row of the CIOS tool. One approach for the user to select the context is shown in FIG. 6. In FIG. 6 a user control 602a, 6023b is provided for scrolling up or down from various contexts. The name of the selected context may be indicated in a text box 604. In this manner, the superset of icons from the appropriate context can be selected and shown in the first row.

In one embodiment, the set of image icons in a context may be static. This may be particularly the case if there are a small number of image icons. For example, the set of icons in an immediate family context may be relatively small. In other contexts, such as a work context, the number of image icons may be relatively large. These could comprise thousands of image icons. Scrolling through a row of image icons comprising a large number of image icons may be time consuming.

Given a selected context, the set of image icons presented to the user may be dynamic. In other words, the set of image icons in a context that can be scrolled and presented in a selected may change. The set of image icons included in a context can vary based on a "stickiness" setting indicated by the user. The stickiness setting determines a subset of the universe of icons that are presented to the user, and that subset is based on a greater likelihood of user interaction with the individual. Recall that in some embodiments the display is limited to a small number (e.g., five icons) of the subset.

An example can illustrate the purpose of the stickiness setting. A user may define a universe of individuals within their family. This may include all known relatives that the user is aware of. In some embodiments, this could include hundreds of relatives, some which the user is not familiar with. Assume the user is using the CIOS tool to search for photos associated with a sibling. The sibling may be considered a close family member, and the user is more likely to interact with a sibling as a family as compared to a distant relative. When the user selects a context of "family members" and is presented with image icons, a subset of the universe may be presented that are close family members. Presenting a subset of the entire universe of family members facilitates selection of the image icon. Scrolling across a large number of image icons can be time consuming and annoying if the user rarely communicates with most of the individuals. A high stickiness setting reduces the number of image icons in the universe, and a low stickiness increases the number of icons in the subset. Thus, the stickiness setting represents a likelihood of the user having interest in interacting with the individual in the universe for that context.

Another example may also illustrate the utility of a stickiness setting. A user may be searching for documents within the context of employees in an enterprise. There may be thousands of employees in the enterprise, but only a dozen in the immediate organization. Selecting an image icon for an individual in a context comprising thousands of image icons, even if arranged in alphabetical order, could be onerous. A stickiness setting can be used to reduce the universe to a subset which is presented to the user. If the user does not find the image icon for the appropriate individual, then the stickiness setting can be decrease to cast a wide scope of the subset.

The system can also be configured to automatically adjust a stickiness level based on prior contacts the user has with individuals in the context. For example, in the context of a work environment, an individual who has recently sent or received communications with the user may be treated as having a higher level of stickiness. Similarly, an individual that has recently sent or received an instant message, voice message, or email with the user is more likely to be of current interest to the user. The CIOS tool may then include that person in the image icon subset of the current context. Similarly, if communications with that person have ceased for a time period, the CIOS tool may remove that person from the list of image icons being shown. The user can still include that person by lowering the stickiness level to encompass a wide net of individuals.

The CIOS tool may incorporate an algorithm based on a straight line, exponentially decaying, or other form of stickiness level adaptation. For example, after a month of no contact, an individual may migrate to a lower level of stickiness—e.g., they are dropped from the subset of image icons normally presented to the user for a given context. One approach for a user indicating an increase or decrease of stickiness is by manipulating the user controls 608 shown in FIG. 6. This user control 608 can be used to modify the stickiness level by a certain level. Other user controls may be used.

The level of granularity of the desired search results can be adjusted by defining additional icons that further limit the information to be returned. An icon can be defined by a user or system administrator to further limit search results for a timeframe, based on specific content, recipient, or subject matter. For example, adding an icon for an individual and defining the person's name is one example of defining an icon's search criteria.

The CIOS tool may offer utilities for the user to define more complicated icon-based search terms. For example, a user could request custom date ranges for searching for documents in the past week, past month, or past three months. A set of three icons used could be defined by the user and each of the three icons would then be mapped to the appropriate date range as defined by the user. Alternatively, a single icon may be defined which opens a window prompting the user to select a data range. Thus, an icon can be associated with additional user-interfaces for further defining the search criteria.

The processing of a search request involves mapping each icon to a search term or terms, constructing the query, and then initiating the search. In some embodiments, a partial search may be conducted based on the image icon, and then the received results can be filtered based on the document type icon. One embodiment of this process flow is shown in FIG. 7.

Figure 7:
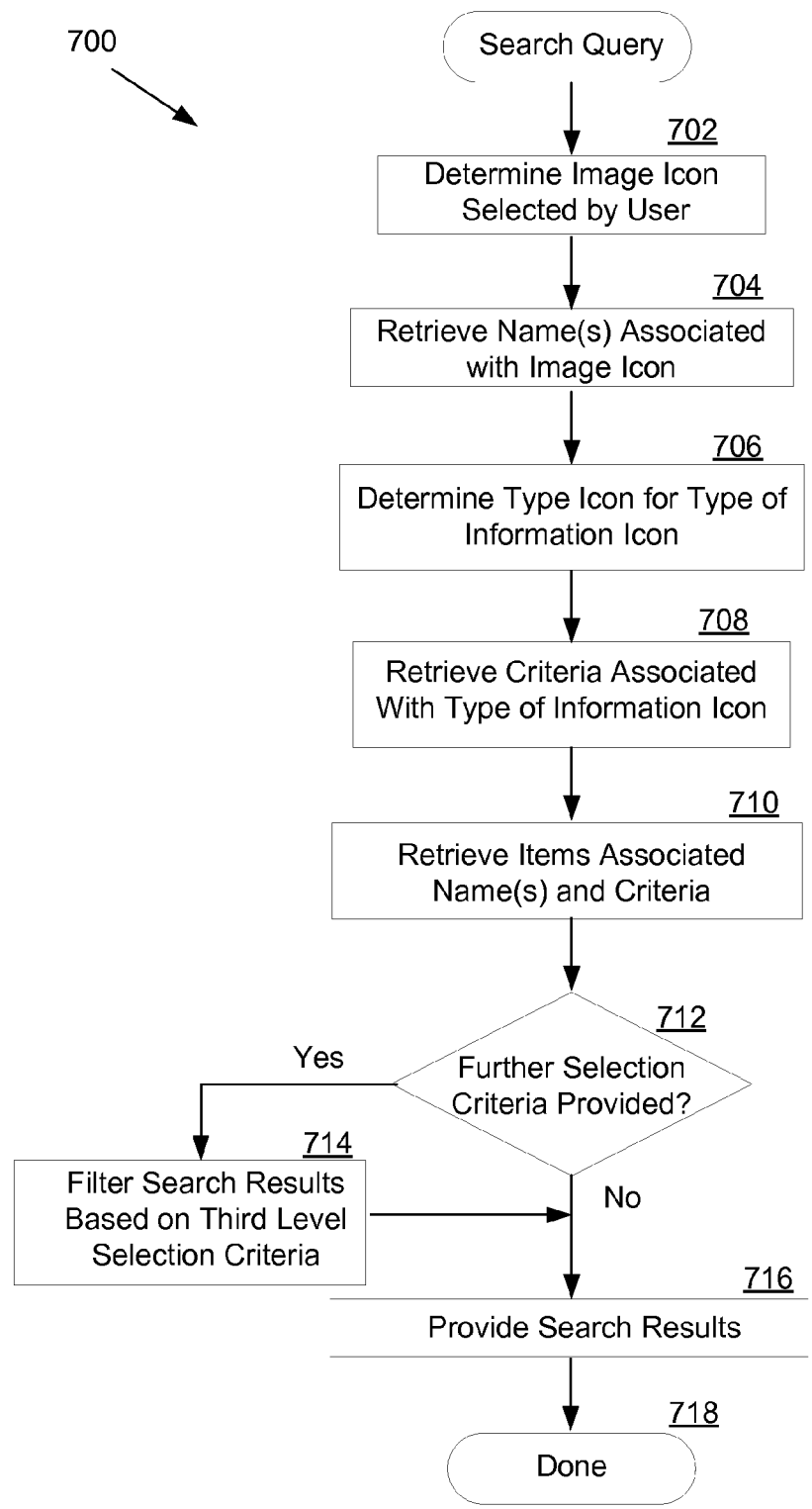
FIG. 7 illustrates a set of process flows associated with responding to a search request and providing search results.

One embodiment of the process flow for processing a search request is illustrated in FIG. 7. It should be appreciated that the logical operations described herein with respect to FIG. 7, and the other FIGURES, are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should also be appreciated that more or less operations may be performed than shown in the FIG. 7 and described herein. These operations may also be performed in a different order than those described herein.

In one embodiment, the user arranges the icons in the user interface as desired by dragging a row of icons until the desired icon is selected. This may be repeated for each row as desired. The user then selects the "Perform Search" user control 401 to initiate the search. This transmits to the server 108 the identity of the selected icons in each of the rows. It is at this point that the process 700 in FIG. 7 begins. The process determines the image icon selected by the user in operation 702. In operation 704, the name(s) associated with the image icon is retrieved. Similarly, in operation 706 the icon associated with the type of document is determined, which may involve retrieving the criteria associated with icon in operation 708 that is specific to a user. Recall that a user or system administrator may be able to define a custom information type icon. In other embodiments the meaning of an icon may be the same for various users.

In operation 710, the search query is performed retrieving the items associated with the names and information type determined above. In many embodiments, at least two icons are selected by the user prior to initiating a search. If there is a third row of icons involved and a third icon is selected, then this may represents a further selection criteria that the CIOS tool will process. If the further selection criterion is present in operation 712, then the above results are filtered in light of the further criteria in operation 714. If there are no further results to filter, then the results can be provided to the user in operation 716. This completes the processing of the search query to the user.

Figure 8:
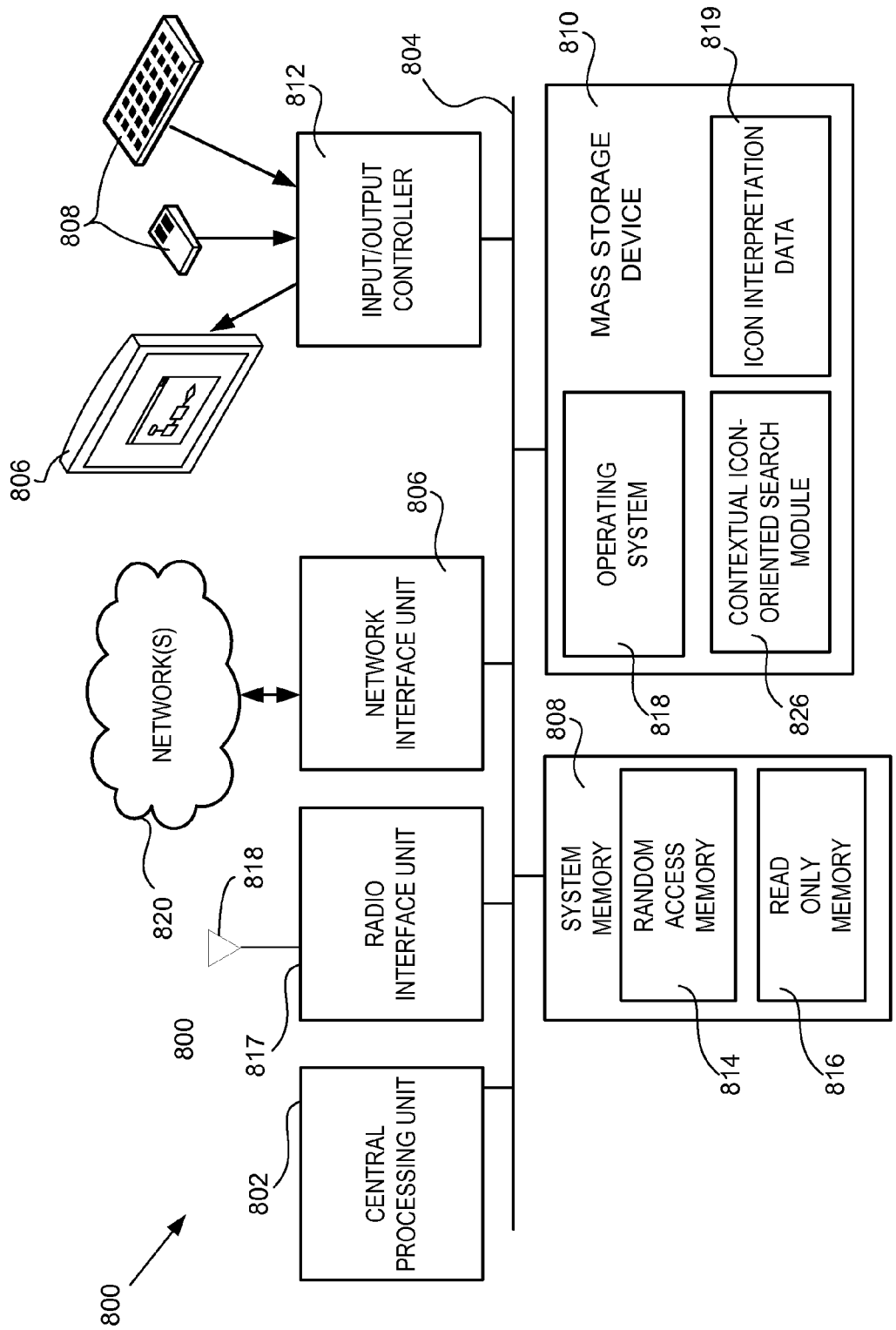
FIG. 8 illustrates a computer architecture of a computer for executing the process flows associated with receiving and responding to a search request.

The process flow described above and other related functions can be implemented in one embodiment by the computing architecture of a computer device 800 as shown in FIG. 8. FIG. 8 shows an illustrative computing architecture for a computing processing device capable of executing the processes described. Although FIG. 8 describes the computing device such as a smart phone 101, laptop 102, or tablet computer 105, the architecture shown in FIG. 8 may illustrate a conventional server computer, desktop computer, or other type of computer utilized to execute any aspect of the software components presented herein. Other architectures or computers may be used to execute the software components presented herein.

The computer architecture shown in FIG. 8 includes a processor 802 (a.k.a. as a centralized processing unit or "CPU"), a system memory 805, including a random access memory 814 ("RAM") and a read-only memory ("ROM") 816, and a system bus 812 that couples the memory to the CPU 802. A basic input/output system containing the basic routines that help to transfer information between elements within the server 800, such as during startup, is stored in the ROM 816. The computer 800 further includes a mass storage device 810 for storing an operating system 818, application programs, and other program modules, as described herein.

The mass storage device 810 is connected to the CPU 802 through a mass storage controller (not shown), which in turn is connected to the bus 812. The mass storage device 810 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available computer storage media that can be accessed by the computer 800.

It should be appreciated by those skilled in the art that computer-readable media may be any available media that can be accessed by the computer 800, including computer-readable storage media and communications media. Communications media includes transitory signals. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800, but the computer readable media does not encompass transitory signals.

According to various embodiments, the computer 800 may operate in a networked environment using logical connections to remote computers or servers through a network (not shown in FIG. 8). The computer 800 may connect to the network 818 connected to a radio interface unit 817. In other embodiments, connection to other types of network may be accomplished using an input/output controller 812. The input/output controller 812 can be used for receiving and processing input from a number of other devices 808, including a keyboard, mouse, or electronic stylus (not shown in FIG. 8). Similarly, an input/output controller 812 may provide output to a display screen 806, a printer, or other type of output device (also not shown in FIG. 8). In one embodiment, the computing device may incorporate a display screen 806 comprising a touch screen display. The touch screen display functions to not only display information, but may also receive input from the user, including inputting text, commands, and controls.

As mentioned briefly above, a number of program modules and data files may be stored in the mass storage device 810 and RAM 814 of the computer 800, including an operating system 818 suitable for controlling the operation of a networked desktop, laptop, tablet or server computer. The mass storage device 810 and RAM 814 may also store one or more program modules or data files. In particular, the mass storage device 810 and the RAM 814 may store the search engine module 826. The mass storage device 810 and RAM 814 may also store icon interpretation data 819 that indicates the search criteria associated with an icon.

It should be appreciated that the software components described herein may, when loaded into the processor 802 and executed, transform the processor 802 and the overall computer 800 from a general-purpose computing system into a special-purpose computing system customized to facilitate the functionality presented herein. The processor 802 may be constructed from any number of transistors or other discrete circuit elements, which may individually or collectively assume any number of states. More specifically, the processor 802 may operate as a finite-state machine, in response to executable instructions contained within the software modules disclosed herein. These computer-executable instructions may transform the processor 802 by specifying how the processor 802 transitions between states, thereby transforming the transistors or other discrete hardware elements constituting the processor 802.

Encoding the software modules presented herein may also transform the physical structure of the computer-readable media presented herein. The specific transformation of physical structure may depend on various factors, in different implementations of this description. Examples of such factors may include, but are not limited to the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It also should be appreciated that the computer 800 may comprise other types of computing devices, including hand-held computers, embedded computer systems, personal digital assistants, and other types of computing devices known to those skilled in the art. It is also contemplated that the computer 800 may not include all of the components shown in FIG. 8, may include other components that are not explicitly shown in FIG. 8, or may utilize an architecture completely different than that shown in FIG. 8.

Based on the foregoing, it should be appreciated that users can indicate a context and select icons from a set associated with that context to determine search criteria for a query. It should also be appreciated that the subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

The invention claimed is:

1. A computer-implemented method for processing a search request comprising:
   providing a user interface by a processor, the user interface displaying a first moveable row of a first set of icons, wherein each icon in the first set of icons represents a person or a group of persons, the first set of icons comprising a subset of a first superset of icons;
   displaying by the processor on the user interface a control that changes a value of a likelihood of interest between a user and each person or group of persons represented by the first set of icons, wherein changing the value of the likelihood of interest one of reduces or increases a quantity of one of persons or groups of persons corresponding to the first set of icons able to be displayed in the first moveable row of the first set of icons;
   displaying by the processor on the user interface a second moveable row of a second set of icons, wherein each icon in the second set of icons represents a type of information, the second set of icons comprising a subset of a second superset of icons;
   displaying by the processor on the user interface a center column within the user interface identifying a selected first icon from the first set of icons and a selected second icon from the second set of icons when a user manipulates the first moveable row of the first set of icons and the second moveable row of the second set of icons;
   receiving a search request at the processor indicating the selected first icon from the first set of icons and the second selected icon from the second set of icons; and
   providing and displaying on the user interface a search result from the processor comprising a name of at least one file, wherein the name of the at least one file is associated with the person or the group of persons represented by the selected first icon and the name of the at least one file is further associated with the type of information represented by the second selected icon.

2. The computer implemented method of claim 1, wherein the operation of providing the user interface displaying the first set of icons further comprises:
   receiving a context indicator that defines a set of individuals having a common affiliation;
   ascertaining the subset of the first superset of icons from the first superset of icons using the context indicator; and
   providing the user interface comprising the first set of icons.

3. The computer implemented method of claim 2, wherein providing on the user interface the second set of icons depends on the first superset of icons ascertained from the plurality of supersets of icons.

4. The computer implemented method of claim 1, wherein the group of persons represents individuals associated with an organization of an enterprise.

5. The computer implemented method of claim 1, further comprising:
   providing on the user interface a third set of icons, wherein each icon in the third set of icons represents a further search criteria of the type of information indicated by the second selected icon, and receiving the search request further indicates a selected third icon.

6. The computer implemented method of claim 5, wherein the first selected icon represents an individual, the second selected icon represents a text-based document, and the selected third icon represents comments added, and providing the search results comprising indicating the name of the at least one file comprising a file with comments added by the individual.

7. A computer readable medium storing instructions thereon which when executed by a processor cause the processor to:
   provide by the processor a user interface displaying a first moveable row of a first set of icons, wherein each icon in the first set of icons represents a person or a group of persons, the first set of icons comprising a subset of a first superset of icons;
   display by the processor on the user interface a control that changes a value of a likelihood of interest between a user and each person or group of persons represented by the first set of icons, wherein changing the value of the likelihood of interest one of reduces or increases a quantity of one of persons or groups of persons corresponding to the first set of icons able to be displayed in the first moveable row of the first set of icons;
   display by the processor on the user interface a second moveable row of a second set of icons, wherein each icon in the second set of icons represents a type of information, the second set of icons comprising a subset of a second superset of icons;
   display by the processor on the user interface a center column within the user interface identifying a selected first icon from the first set of icons and a selected second icon from the second set of icons when a user manipulates the first moveable row of the first set of icons and the second moveable row of the second set of icons;

receive a search request at the processor indicating the selected first icon from the first set of icons and the second selected icon from the second set of icons; and provide and display on the user interface a search result from the processor, the search result comprising a name of at least one file, wherein the name of the at least one file is associated with the person or the group of persons represented by the selected first icon and the name of the at least one file is further associated with the type of information represented by the second selected icon.

8. The computer readable medium of claim 7, wherein the operation of providing the user interface displaying the first set of icons further comprises:

receive a context indicator that defines a set of individuals having a common affiliation;

ascertain the subset of the first superset of icons from the first superset of icons using the context indicator; and provide the user interface comprising the first set of icons.

9. The computer readable medium of claim 8, wherein providing on the user interface the second set of icons depends on the first superset of icons ascertained from the plurality of supersets of icons.

10. The computer readable medium of claim 9, wherein the instructions further cause the processor to:

display by the processor on the user interface a third set of icons, wherein each icon in the third set of icons represents a further search criteria of the type of information indicated by the second selected icon, and receiving the search request further indicates a selected third icon.

11. A server configured for processing search requests comprising:

a user interface for receiving a search request from a computing device;

a memory configured to store a first superset of icons, each icon representing a person or a group of persons, the memory further configured to store a second plurality of second icons representing a document type; and a processor configured to display on the user interface a first moveable row of a first subset of the first superset of icons and a second moveable row of a second subset of the second superset of icons, display on the user interface a control that changes a value of a likelihood of interest between a user and each person or group of persons represented by the first subset of the first superset of icons, wherein changing the value of the likelihood of interest one of reduces or increases a quantity of one of persons or groups of persons corresponding to the first subset of the first superset of icons able to be displayed in the first moveable row of the first subset of the first superset of icons;

display on the user interface a center column for identifying a selected first icon from the first set of icons and a selected second icon from the second set of icons when a user manipulates the first moveable row of the first set of icons and the second moveable row of the second set of icons, receive the search request comprising the first selected icon from the first subset and the second selected icon from the second subset, retrieve at least one filename of a document where the document is associated with an individual or group of individuals associated with the first selected icon and where the document is of a type associated with the second selected icon, and providing the at least one filename of the document to the computing device for display on the user interface in response to the search request.

12. The server of claim 11, wherein the processor is further configured to:

display on the user interface a third set of icons, wherein each icon in the third set of icons represents a further search criteria of the type of information indicated by the second selected icon, and the operation of receive the search request further comprises receiving a selected third icon from the third set of icons.

13. The server of claim 12, wherein the third set of icons provided on the user interface depends on the first superset of icons.

14. The server of claim 13, wherein the processor is further configured to:

receive a context indicator that defines a set of individuals having a common affiliation;

ascertain the subset of the first superset of icons from of the first superset of icons using the context indicator; and provide the user interface comprising the first set of icons.

15. The server of claim 14, wherein the first selected icon represents an individual, the second selected icon represents a graphics-based document, and the selected third icon represents search criteria comprising files that have been created or authored by a selected individual, and providing the search results comprising indicating the name of the at least one file comprising a file comprising graphics authored by the individual.

* * * * *